Oct. 1, 1963 L. BRYAN 3,105,483
PORTABLE AND COLLAPSIBLE COOKING DEVICE
Filed Feb. 13, 1962 2 Sheets-Sheet 1

INVENTOR
LLOYD BRYAN
BY
ATTORNEY

Oct. 1, 1963     L. BRYAN     3,105,483
PORTABLE AND COLLAPSIBLE COOKING DEVICE
Filed Feb. 13, 1962     2 Sheets-Sheet 2

INVENTOR
LLOYD BRYAN
BY
ATTORNEY 3,105,483
PORTABLE AND COLLAPSIBLE COOKING DEVICE
Lloyd Bryan, 1780 Atlas Peak Road, Napa, Calif.
Filed Feb. 13, 1962, Ser. No. 172,994
5 Claims. (Cl. 126—9)

The present invention relates to portable cooking devices and more particularly to a portable cooking device which may be of knock-down construction whereby to occupy a minimum amount of space when not in use.

Portable, collapsible cooking devices have heretofore been proposed. An object of this invention is to provide a collapsible cooking device in the form of a portable barbecue for grilling, roasting or smoking foods with charcoal or the like, said barbecue including an oven compartment having a stationary grill, a vertically adjustable firepan, a firebox section which may be readily disassembled and lower section for storing barbecue tools, gloves, charcoal and the like.

Further objects of the invention are to provide a portable, collapsible cooking device which is simple in structure, of sturdy construction, easy to assemble and disassemble, economical to manufacture and efficient in operation.

Other objects and advantages of the present invention will be readily apparent from the following detailed description taken in conjunction with the accompanying drawings, in which.

Figure 2:
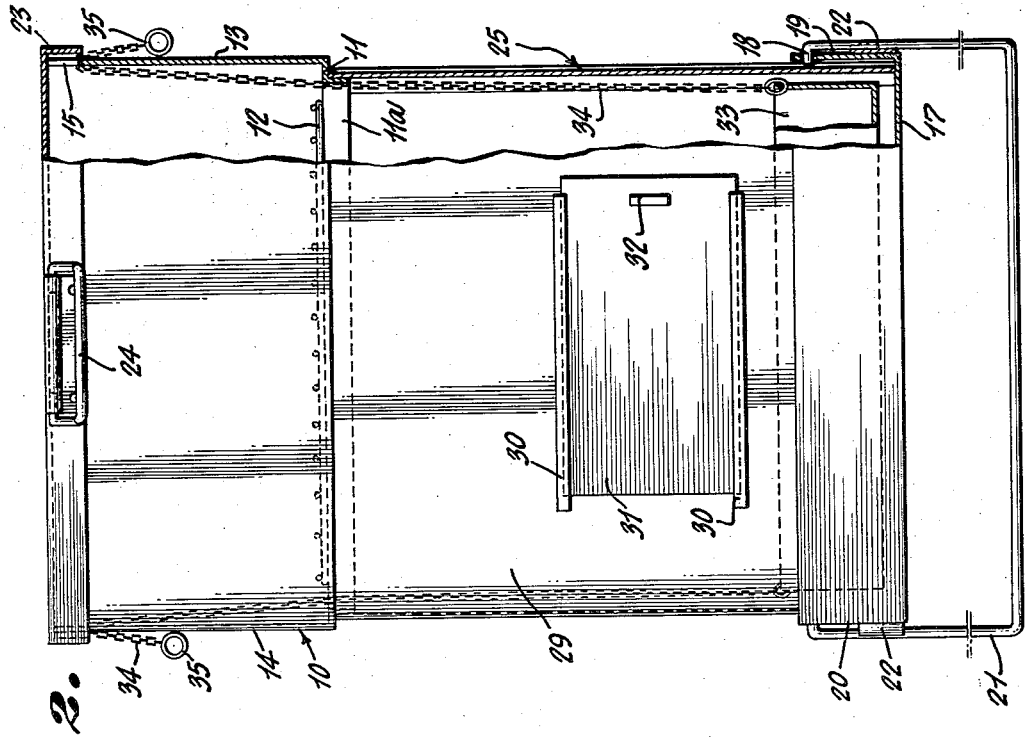
FIGURE 2 is a front view, with a part broken away, of the cooking device in assembled condition ready for use.

Referring to the drawings in detail, numeral 10 designates the oven part of the device in the form of a rectangular shell open at the top and bottom. The shell 10 has inwardly projecting flanges 11 at the bottom thereof for supporting a removable grill 12. The flanges 11 terminate in a downwardly extending neck 11a. Two oppositely disposed walls 13 and 14 of the shell are suitably notched at 15 and 16 for a purpose to be described.

Figure 1:
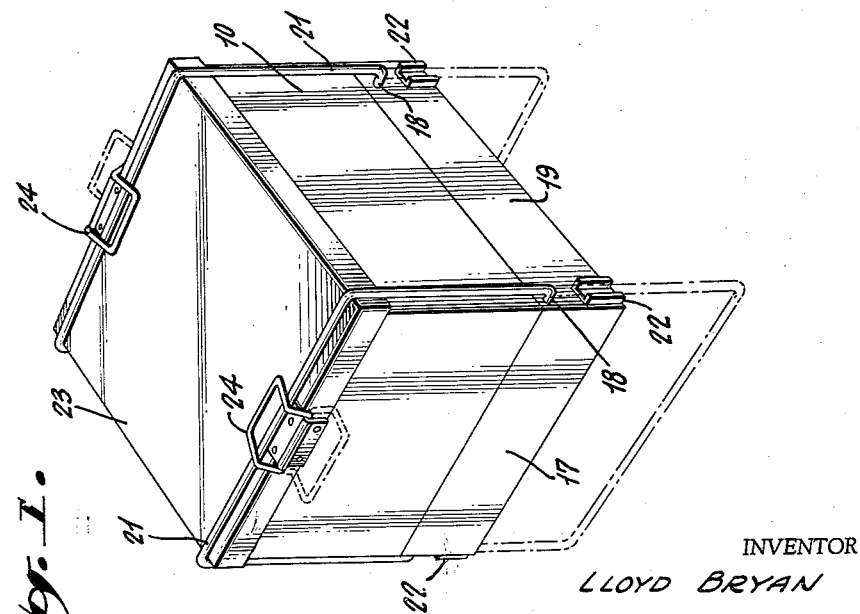
FIGURE 1 is a perspective view of the present cooking device in collapsed or portable condition.
Figure 3:
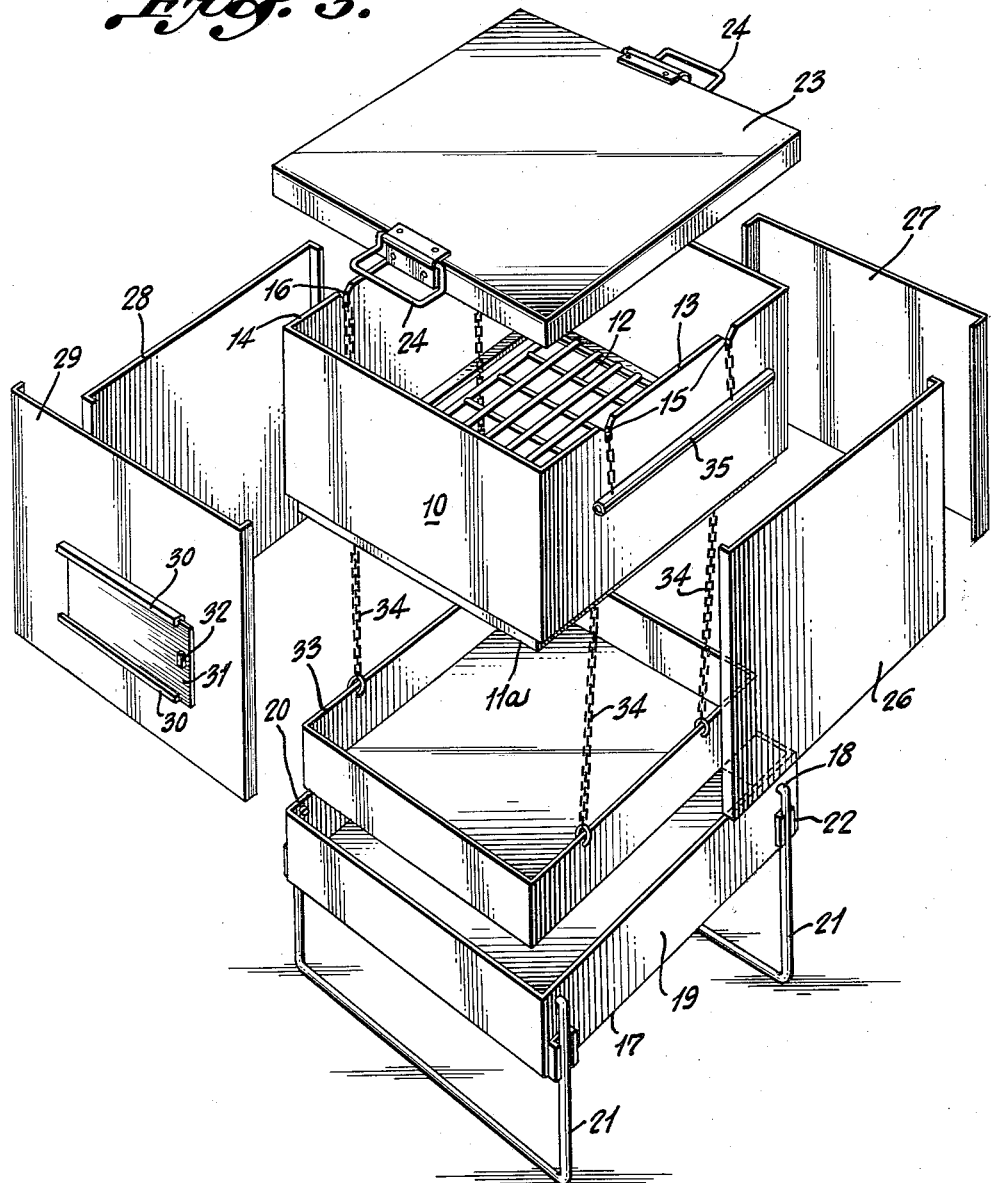
FIGURE 3 is an exploded view of the present invention.

The lower section 17 comprises a shallow tray provided with a pair of holes 18 in oppositely disposed walls 19 and 20. The holes are adapted to receive a pair of bail members 21 which serve as legs for elevating the cooking device off the ground. Each of the legs is in the form of a steel rod bent to U-shape with the free ends turned inwardly a short distance to be received in the holes 18. Positioned below each of the holes 18 and secured to the walls 19 and 20 are brackets 22 for supporting the legs 21 in operative position. The cover 23 fits over the stove portion 10 and includes oppositely disposed bent handles 24. As seen in FIGURE 1, the legs 21 are foldable to a position over the cover 23 and cooperate with the handles 24 to hold the cooking device in locked position.

In the extended position of the cooking device as seen in FIGURE 2, a firebox section 25 is provided. The firebox comprises four wall sections 26, 27, 28 and 29 of similar configuration, each of the wall sections having vertically inturned flanges and adapted to interfit with each other to form the firebox wall. The assembled firebox is of such size as to fit within the lower section 17 and to receive the neck portion 11a to hold the assembled parts in operative position. The wall section 29 is provided with a door opening surrounded by integrally protruding flanges 30 for receiving a sliding closure 31. The closure 31 is provided with a protuberance 32 for manipulating the door to open or closed position.

The firepan 33 is in the form of a shallow tray and has connected thereto four chains 34, the upper ends of which are anchored to a pair of bars 35. The firepan is vertically adjustable by means of the four chains being receivable in the notches 15.

As seen in FIGURE 2, the cooking device is shown ready for use. The grate is shown in its lowermost position but may be raised to any desired height as explained in the preceding paragraph. When the device is to be collapsed for storing purposes as shown in FIGURE 1, the four walls sections of the firebox are disassembled and placed in the lower section 17 or in the stove section 10. The chains 34 are unhooked from slots 15 and the upper ends placed in stove section 10. The neck portion 11a fits within lower section 17 and bail members 21 disengaged from brackets 22 and swing into position over the cover 23 and held in locked position by handles 24.

From the foregoing description, it will be readily apparent that the present invention is well adapted to accomplish the objects and advantages set forth. It will be clear that minor changes may be made in the details of construction without departing from the spirit of the invention except as required by the following claims:

Having thus described the invention, what is claimed is:

1. A portable and knock-down cooking device comprisig a bottom receptacle open at the top, an oven section open at the top and bottom thereof, said oven section having a reduced neck portion at the bottom thereof for fitting within the open top of the bottom receptacle in the knock-down position, a grill supported on said reduced neck portion, a cover for said oven section, a plurality of interfitting panels forming a hollow firebox section, said firebox section fitting between the oven and the bottom receptacle when in assembled position, a vertically adjustable firepan and means attached to the firepan for cooperation with the oven to hold the grate in vertically adjustable positions.

2. A cooking device as defined in claim 1, said means comprising a plurality of chain members, and notches formed in the upper edge of said oven to receive said chains.

3. A cooking device as defined in claim 1, a pair of bail members pivotally mounted to the end bottom receptacle and movable to a position overlying the cover when the device is in knock-down position, and means on said receptacle for holding the bail members in leg supporting position.

4. A portable and knock-down cooking device comprising a bottom receptacle open at the top. an oven section open at the top and bottom thereof, said oven section having a reduced neck portion at the bottom thereof for fitting within the open top of the bottom receptacle in the knock-down position, a grill supported on said reduced neck portion, a cover for said oven section, a plurality of interfitting panels forming a hollow firebox section, said firebox section fitting between the oven and the bottom receptacle when in assembled position, a vertically adjustable firepan, a plurality of chain members attached to the firepan, notches formed in the upper edge of said oven to receive said chains to hold the firepan in vertically adjustable positions, leg forming bail members pivoted to the bottom receptacle and means on said receptacle for holding the bail members in leg supporting position.

5. A portable and knock-down cooking device comprising a bottom receptacle open at the top, an oven section open at the top and bottom thereof, said oven section having a reduced neck portion at the bottom thereof for fitting within the open top of the bottom receptacle in the knock-down position, a grill supported on said reduced neck portion, a cover for said oven section, a plurality of interfitting panels forming a hollow firebox section, said firebox section fitting between the oven and the bottom receptacle when in assembled position, a vertically adjustable firepan, a plurality of chain members attached to the firepan, notches formed in the upper edge of said oven to receive said chains to hold the firepan in vertically adjustable positions, leg forming bail members pivoted to the bottom receptacle and means on said receptacle for holding the bail members in leg supporting position, said bail members being of U-shaped construction and movable to a position overlying the cover when the device is in knock-down position.

References Cited in the file of this patent

UNITED STATES PATENTS

| | | |
|---|---|---|
| 1,438,345 | Tait et al. | Dec. 12, 1922 |
| 2,334,847 | Spiers | Nov. 23, 1943 |
| 2,473,569 | Cast | June 21, 1949 |
| 2,477,529 | Sprinkle et al. | July 26, 1949 |
| 2,985,164 | Imoto | May 23, 1961 |